United States Patent [19]
Birsching

[11] Patent Number: 5,655,621
[45] Date of Patent: Aug. 12, 1997

[54] MOTOR VEHICLE POWER STEERING GEAR

[75] Inventor: Joel Edward Birsching, Unionville, Mich.

[73] Assignee: General Motors Corporation, Detroit, Mich.

[21] Appl. No.: 497,570

[22] Filed: Jun. 30, 1995

[51] Int. Cl.$^6$ ...................................................... B62D 5/22
[52] U.S. Cl. ........................ 180/428; 180/421; 91/375 A
[58] Field of Search ................................... 180/417, 421, 180/428; 91/375 A

[56] References Cited

U.S. PATENT DOCUMENTS

| | | | |
|---|---|---|---|
| 4,454,801 | 6/1984 | Spann | 91/375 A |
| 4,862,982 | 9/1989 | Saito et al. | 180/443 |
| 5,119,898 | 6/1992 | Eckhardt et al. | 180/142 |

*Primary Examiner*—Kevin Hurley
*Attorney, Agent, or Firm*—Saul Schwartz

[57] ABSTRACT

A motor vehicle power steering gear including a housing, a spool shaft rotatably supported on the housing, a pinion head rotatably supported on the housing, a valve body rotatably supported on the spool shaft, and a universal joint between the valve body and the pinion head. The universal joint includes a ring-shaped spider, a first diametrically opposite pair of trunnions on the spider are slidable and rotatable in pair of sockets in the valve body, and a second diametrically opposite pair trunnions on the pinion head are slidable and rotatable in a pair of sockets in the spider. The trunnions and sockets permit relative translation between the valve body and pinion head in mutually perpendicular lateral directions in the plane of the spider and relative rotation about mutually perpendicular lateral centerlines in the plane of the ring to prevent binding between the valve body and the spool shaft. The trunnions and the sockets positively locate the valve body relative to the pinion head by preventing relative translation therebetween perpendicular to the plane of the spider, i.e., longitudinally, and transfer torque between the valve body and pinion head in lash-free fashion by preventing relative rotation therebetween about a longitudinal centerline perpendicular to the plane of the spider.

5 Claims, 2 Drawing Sheets

MOTOR VEHICLE POWER STEERING GEAR

FIELD OF THE INVENTION

This invention relates to motor vehicle power steering gears.

BACKGROUND OF THE INVENTION

In motor vehicle power steering gears, such as described in U.S. Pat. No. 4,454,801, issued Jun. 19, 1984 and assigned to the assignee of this invention, manual effort applied to an input or spool shaft of the steering gear is reacted to an output element or pinion head of the steering gear through a torsion bar which twists through an angle proportional to the applied effort. A control valve of the steering gear has a valve spool rotatable with the spool shaft and a valve body around the valve spool rotatable with the pinion head. Throttling orifices defined between the valve body and the valve spool open and close to regulate a steering assist boost pressure in accordance with the angle through which applied manual effort twists the torsion bar. Close tolerance between the valve body and the valve spool minimizes fluid leakage around the throttling orifices. To minimize valve hysteresis attributable to rubbing or binding of the valve body against the valve spool due to minor runout or eccentricity of the valve spool relative to the pinion head, the valve body is connected to the pinion head through a simple universal joint consisting of a radially oriented spherical pin on the pinion head received in a cylindrical socket in the valve body.

U.S. Pat. No. 5,119,898, issued Jun. 9, 1992 and assigned to the assignee of this invention, describes a variable effort power steering gear having a control valve substantially as described in the aforesaid U.S. Pat. No. 4,454,801 and an electromagnetic apparatus for varying the centering force of the torsion bar. The electromagnetic apparatus includes a magnet ring connected to the spool shaft, a pole piece connected to the valve body at the opposite end thereof from the pinion head, and an exciting coil for inducing electromagnetic torque between the magnet ring and the pole piece. A second radially oriented pin on the pinion head diametrically opposite the aforesaid radially oriented pin is closely received in a slot in the valve body to minimize binding between the valve body and valve spool attributable to reaction of electromagnetic torque through the valve body. Because the second radially oriented pin limits the degrees of freedom between the valve body and pinion head afforded by the simple universal joint consisting of just the spherical pin and cylindrical socket, more precise and expensive manufacturing techniques are required to achieve acceptably low valve hysteresis.

SUMMARY OF THE INVENTION

This invention is a new and improved motor vehicle power steering gear including a housing, a spool shaft rotatably supported on the housing, a pinion head rotatably supported on the housing, a valve body rotatably supported on the spool shaft, and a universal joint between the valve body and the pinion head. The universal joint includes a ring-shaped spider between the pinion head and the valve body, a first pair of diametrically opposite rigid trunnions on the spider slideable and rotatable in pair of sockets in the valve body, and a second pair of diametrically opposite rigid trunnions on the pinion head slidable and rotatable in a pair of sockets in the spider. The trunnions and sockets permit relative translation between the valve body and pinion head in mutually perpendicular lateral directions in the plane of the ring and relative rotation about mutually perpendicular lateral centerlines in the plane of the ring to prevent binding between the valve body and the spool shaft. The trunnions and the sockets positively locate the valve body relative to the pinion head by preventing relative translation therebetween perpendicular to the plane of the ring, i.e. longitudinally, and transfer torque between the valve body and pinion head in lash-free fashion by preventing relative rotation therebetween about a longitudinal centerline perpendicular to the plane of the ring. In a preferred embodiment, the power steering gear further includes a torsion bar inducing a centering force between the pinion head and the spool shaft and a variable effort means varying the effective centering force of the torsion bar by reacting an electromagnetic torque between the pinion head and the spool shaft through the valve body and the universal joint.

DESCRIPTION OF A PREFERRED EMBODIMENT

Figure 1:
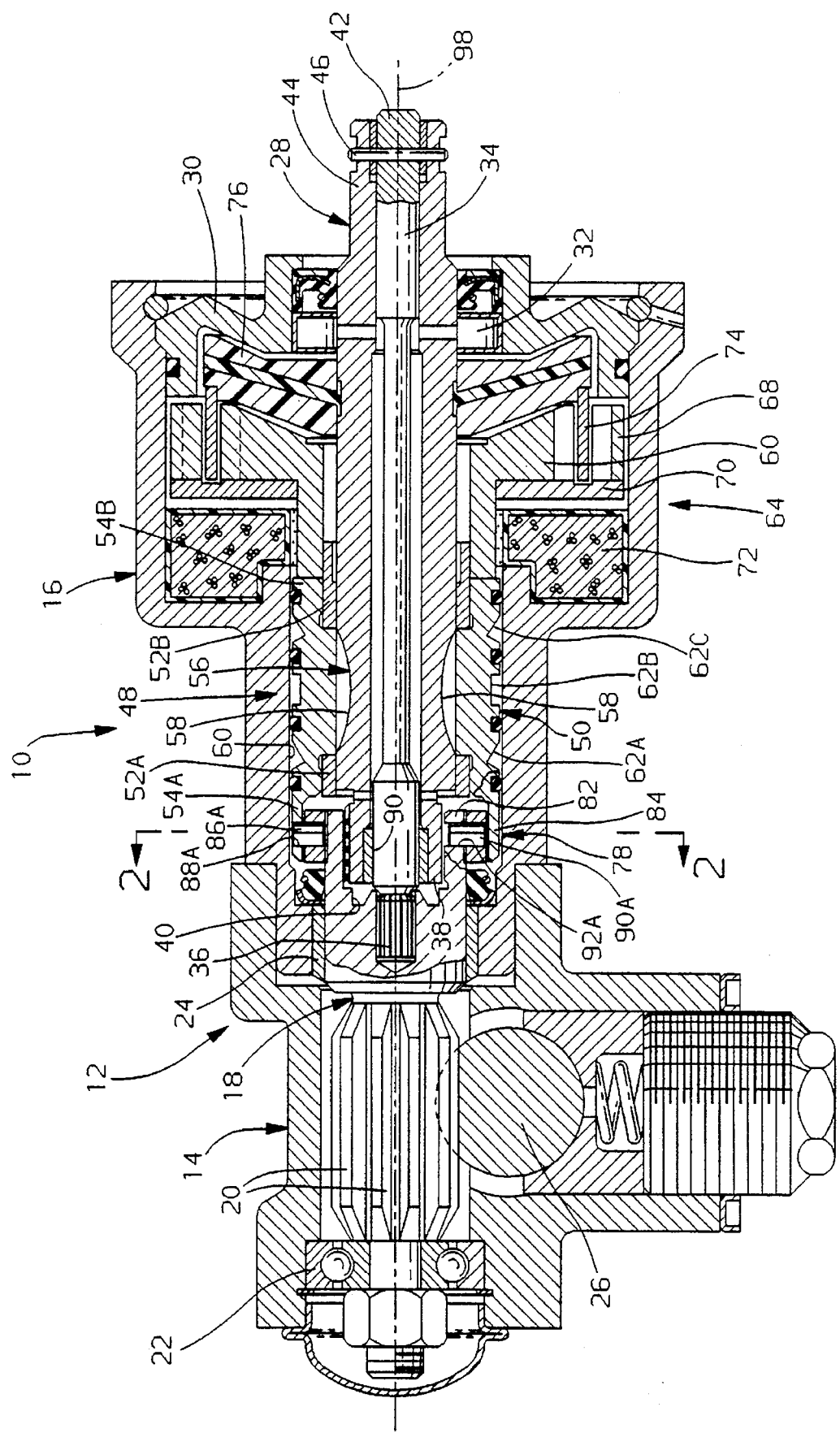
FIG. 1 is a longitudinal sectional view of a motor vehicle power steering gear according to this invention.

A variable effort motor vehicle power steering gear 10 according to this invention, similar to the variable effort power steering gear described in the aforesaid U.S. Pat. No. 5,119,898, includes a housing 12 consisting of a rack housing 14 and a valve housing 16. A pinion head 18 having a plurality of gear teeth 20 thereon is rotatably supported on the rack housing 14 by a ball bearing 22 and by a sleeve bearing 24. A rack bar 26 having a plurality of rack teeth meshing with the gear teeth 20 on the pinion head is supported on the rack housing 14 for lateral translation in response to rotation of the pinion head. The ends of the rack bar, not shown, are connected to steerable wheels of the motor vehicle in conventional fashion.

A tubular spool shaft 28 of the steering gear protrudes into the valve housing 16 through a cover 30 on the valve housing and is rotatably supported on the cover by a bearing 32. A torsion bar 34 inside the tubular spool shaft has an inboard end 36 protruding beyond a corresponding inboard end 38 of the spool shaft and force fitted in a serrated bore at the bottom of a counterbore 40 in the pinion head 18. An outboard end 42 of the torsion bar is rigidly connected to the spool shaft 28 at an outboard end 44 of the latter by a pin 46. The outboard end 44 of the spool shaft is connected to a manual steering wheel, not shown, of the motor vehicle for rotation as a unit therewith. A lost motion connection in the counterbore 40 permits about 7° of twist of the torsion bar and corresponding relative angular movement between the pinion head and the inboard end 38 of the spool shaft.

A proportional control valve 48 of the steering gear 10, similar to a valve described in the aforesaid U.S. Pat. No. 4,454,801, includes a tubular valve body 50 rotatably supported on the spool shaft by a pair of rings 52A-B press fitted in counterbores in respective ones of a pair of opposite ends 54A-B of the valve body and closely received around the spool shaft. A valve spool 56 of the proportional control valve 48 is defined on the part of the spool shaft 28 between the ends 54A-B of the valve body and includes a plurality of arc-shaped slots 58 facing a plurality of internal grooves, not shown, in the valve body and cooperating therewith in defining a plurality of throttling orifices, not shown, which open and close in response to relative rotation between the valve body and the spool shaft.

The valve body 50 is relatively loosely disposed inside a cylindrical wall 60 of the valve housing 16. A plurality of outside annular grooves 62A–C on the valve body 50 are isolated from each other by seal rings on the valve body slidably engaging the cylindrical wall 60. The grooves 62A, 62C are connected to opposite working chambers, not shown, of a steering assist fluid motor. The groove 62B is connected to a pump, not shown. When the valve spool rotates relative to the valve body, the ones of the throttling orifices which are closing regulate a boost pressure in the corresponding one of the annular grooves 62A, 62C and one chamber of the steering assist fluid motor. The ones of the throttling orifices which are opening facilitate unrestricted drainage of low pressure fluid from the other of the working chambers of the fluid motor.

An electromagnetic apparatus 64 of the steering gear 10 includes an inner pole piece 66 and an outer pole piece 68 rigidly connected to the inner pole piece by an annular disc 70. The inner pole piece is rigidly connected to the ring 52B on the valve body whereby the pole pieces 66,68 are rotatable as a unit with the valve body 50. An encapsulated annular exciting coil 72 is rigidly mounted on the valve housing 16 adjacent the pole pieces 66,68.

The electromagnetic apparatus 64 further includes a permanent magnet assembly consisting of a cylindrical magnet ring 74 between the inner and outer pole pieces 66,68 and a plastic retaining hub 76 rigidly attached to the magnet ring and to the spool shaft 28 so that the magnet ring 74 is rotatable as a unit with the spool shaft. The magnet ring is made of sintered powdered metal which is exposed to a strong, externally created magnet field such that a plurality of radially oriented permanent magnets, not shown, are formed on the magnet ring. When the exciting coil is mined on, an electromagnetic torque reaction is induced between the valve body 50 and the spool shaft 28 the direction and magnitude of which depends on the direction and magnitude of the flow of direct current in the exciting coil.

A universal joint 78 between the valve body 50 and the pinion head 18 includes a ring-shaped spider 80 in an annulus defined between a tubular inboard end 82 of the pinion head and a tubular skirt 84 on the valve body overhanging the end 54A thereof. A first diametrically opposite pair of trunnions 86A–B are rigidly attached to the spider 80 and are slidably and rotatably received in a corresponding first pair of sockets 88A–B in the skirt 84 of the valve body. A second diametrically opposite pair of trunnions 90A–B in a common plane with the first pair of trunnions 86A–B, i.e., the plane of the spider 80, are rigidly attached to the tubular end 82 of the pinion head 18 and are slidably and rotatably received in a corresponding second pair of sockets 92A–B in the spider 80. The first pair of trunnions and sockets 86A–B, 88A–B are angularly offset or rotated from the second pair of trunnions and sockets 90A–B, 92A–B by 90°.

Figure 2:
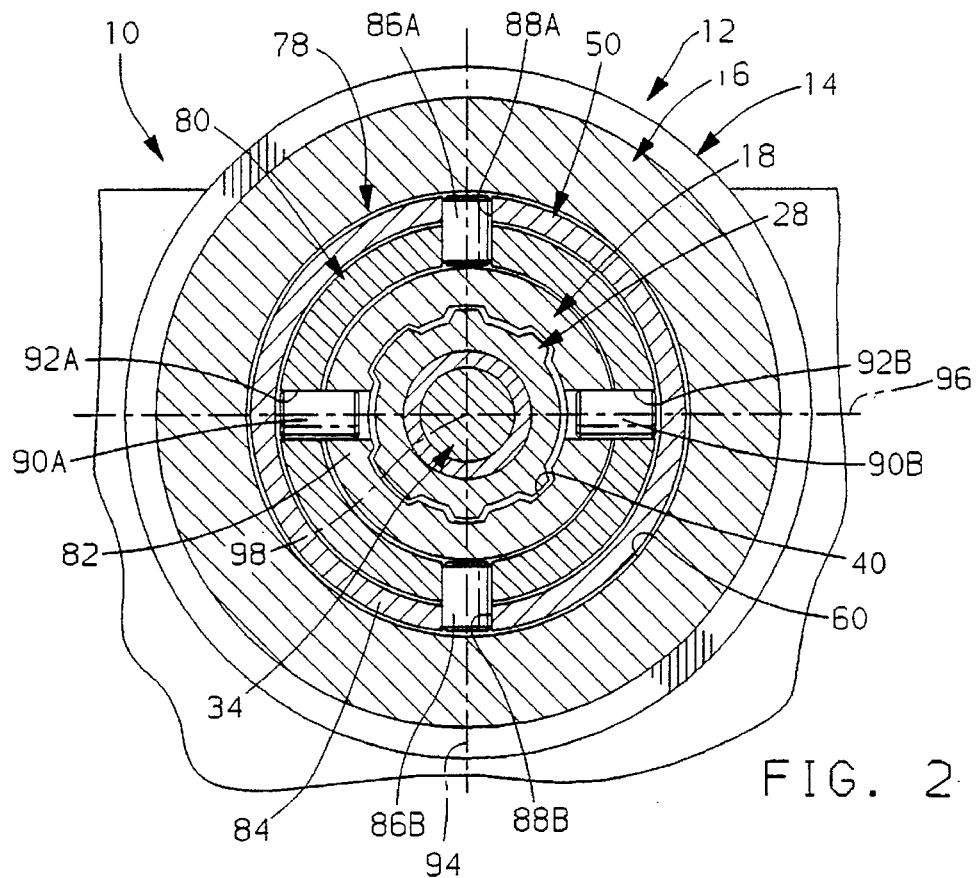
FIG. 2 is a sectional view taken generally along the plane indicated by lines 2—2 in FIG. 1.
Figure 3:
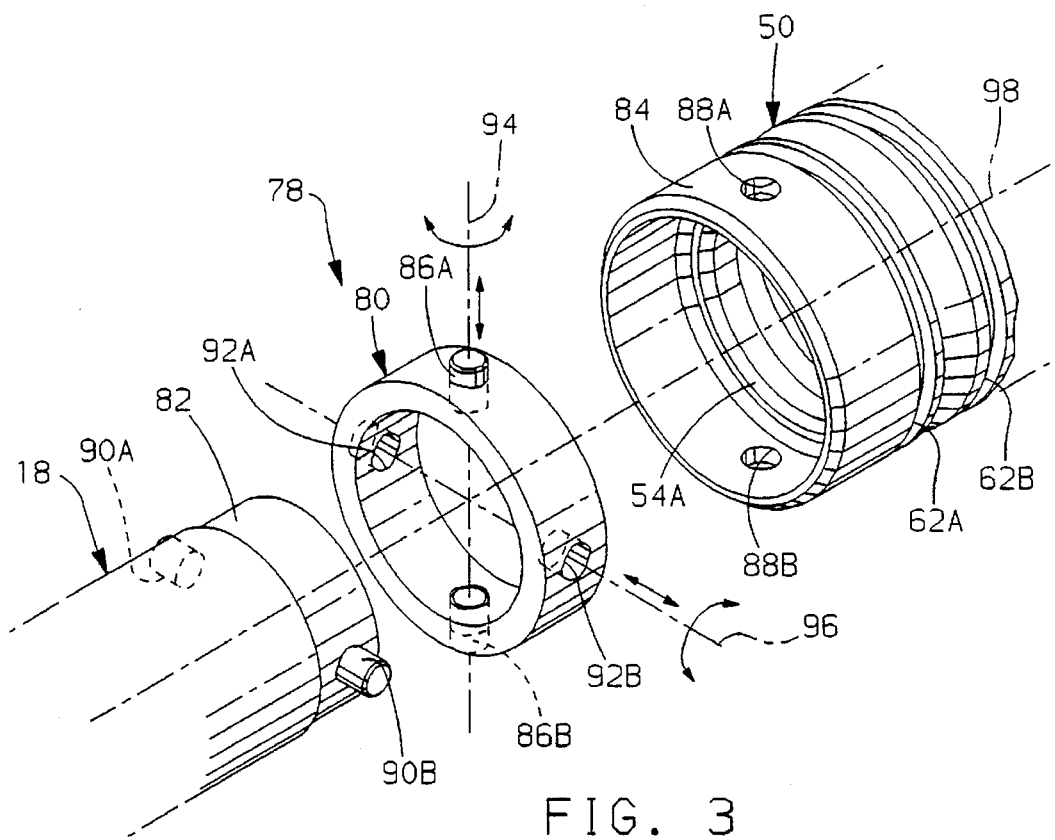
FIG. 3 is a fragmentary, partially broken-away, exploded perspective view of the motor vehicle power steering gear according to this invention.

As seen best in FIGS. 2–3, the valve body is permitted by the first pair of trunnions and sockets 86A–B, 88A–B to float or translate relative to the pinion head in a first direction in the plane of the spider 80 parallel to a first lateral centerline 94 and to rotate relative to the pinion head about the first lateral centerline. The valve body and the spider 80 are permitted by the second pair of trunnions and sockets 90A–B, 92A–B to float or translate as a unit relative to the pinion head in a second direction in the plane of the spider 80, perpendicular to the first direction, parallel to a second lateral centerline 96 and to rotate relative to the pinion head about the second lateral centerline. The trunnions 86A–B, 90A–B and the sockets 88A–B, 92A–B positively locate the valve body relative to the pinion head by preventing translation of the valve body relative to the pinion head perpendicular to the plane of the spider 80, i.e., parallel to a longitudinal centerline 98, and by preventing rotation of the valve body relative to the pinion head about the longitudinal centerline 98.

In operation, the torsion bar defines an open-center position of the valve spool relative to the valve body in which all of the throttling orifices are equally open and fluid circulates freely from the groove 62B to a drain, not shown, connected to a reservoir. When a driver rams the manual steering wheel, the spool shaft 28 rotates relative to the pinion head against a centering force induced by the twist of the torsion bar. The valve body 50 is held stationary relative to the spool shaft by the pinion head 18 through the universal joint 78 so that the valve spool 28 rotates relative to the valve body 50 to close appropriate ones of the throttling orifices for regulating a steering assist boost pressure.

At the same time, electromagnetic torque between the magnet ring 74 and the pole pieces 66,68 induced by electric current in the exciting coil 72 is reacted to the spool shaft 28 through the retaining hub 76 and to the valve body 50 through the ring 52B. The universal joint 78, by preventing relative rotation between the valve body and the pinion head about the longitudinal centerline 98, transfers the electromagnetic torque in lash-free fashion between the valve body 50 and the pinion head 18. Depending upon the direction of current flow in the exciting coil, the induced electromagnetic torque increases or decreases the effective centering force of the torsion bar to vary the proportionality of the control valve 48. Because the universal joint permits the valve body to float relative to the pinion head in the first and second lateral directions and to rotate about the first and second lateral centerlines 94,96, binding is minimized between the valve body and the spool shaft in the presence of radial runout or eccentricity between the spool shaft and the pinion head attributable to manufacturing tolerances.

I claim:

1. A motor vehicle power steering gear comprising:

a housing, a pinion head rotatably supported on said housing, a spool shaft rotatably supported on said housing, a tubular valve body rotatably supported on said spool shaft, a universal joint spider defining a flat plane, means connecting said valve body to said spider means for relative translation parallel to a first lateral centerline in said flat plane of said spider means and for relative rotation about said first lateral centerline and preventing relative translation parallel to a longitudinal centerline perpendicular to said flat plane of said spider means and relative rotation about said longitudinal centerline, and means connecting said pinion head to said spider means for relative translation parallel to a second lateral centerline in said flat plane of said spider means perpendicular to said first lateral centerline and for relative rotation about said second lateral centerline and preventing relative translation parallel to said longitudinal centerline and relative rotation about said longitudinal centerline.

2. A motor vehicle power steering gear comprising:

a housing, a pinion head rotatably supported on said housing having a tubular end, a spool shaft rotatably supported on said housing, a tubular valve body rotatably supported on said spool shaft having a cylindrical skirt overlapping and radially outboard of said tubular end of said pinion head, a cylindrical ring between said tubular end of said pinion head and said cylindrical skirt of said valve body defining a universal joint spider having a flat plane, means connecting said valve body to said cylindrical ring for relative translation parallel to a first lateral centerline in said flat plane of said spider and for relative rotation about said first lateral centerline and preventing relative translation parallel to a longitudinal centerline perpendicular to said flat plane of said spider and relative rotation about said longitudinal centerline, and means connecting said pinion head to said cylindrical ring for relative translation parallel to a second lateral centerline in said flat plane of said spider perpendicular to said first lateral centerline and for relative rotation about said second lateral centerline and preventing relative translation parallel to said longitudinal centerline and relative rotation about said longitudinal centerline.

3. The motor vehicle power steering gear recited in claim 2 wherein said means connecting said valve body to said cylindrical ring and said means connecting said pinion head to said cylindrical ring comprises:

a first diametrically opposite pair of trunnions rigidly connected to said cylindrical ring and aligned on said first lateral centerline, a first pair of sockets in said cylindrical skirt of said valve body each slidably and rotatably receiving a respective one of said first pair of trunnions, a second diametrically opposite pair of trunnions rigidly connected to said tubular end of said pinion head and aligned on said second lateral centerline, and a second pair of sockets in said cylindrical ring each slidably and rotatably receiving a respective one of said second pair of trunnions.

4. The motor vehicle power steering gear recited in claim 3 further comprising:

a torsion bar having a first end connected to said spool shaft and a second end connected to said pinion head operative to induce a centering force between said spool shaft and said pinion head in response to relative rotation therebetween, and a variable effort means connected to said spool shaft and to said valve body at an end thereof opposite said cylindrical skirt selectively operable to induce a torque reaction between said spool shaft and said pinion head through said valve body and said cylindrical ring.

5. The motor vehicle power steering gear recited in claim 4 wherein said variable effort means comprises:

a permanent magnet ring rigidly connected said spool shaft, a pole piece rigidly connected to said valve body at said end thereof opposite said cylindrical skirt, and an exciting coil on said housing operative to induce an electromagnetic torque between said magnet ring and said pole piece when an electric current flows through said exciting coil.

* * * * *